US011060683B2

(12) United States Patent
Hahn et al.

(10) Patent No.: US 11,060,683 B2
(45) Date of Patent: Jul. 13, 2021

(54) LIGHTING DEVICE FOR A MOTOR VEHICLE, AND METHOD FOR PRODUCING SAME

(71) Applicant: HELLA GMBH & CO. KGAA, Lippstadt (DE)

(72) Inventors: Matthias Hahn, Bern (CH); Ulrich Temme, Lippstadt (DE); Christian Wieck, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/020,183

(22) Filed: Sep. 14, 2020

(65) Prior Publication Data

US 2020/0408376 A1    Dec. 31, 2020

Related U.S. Application Data

(63) Continuation of application No. PCT/EP2019/053382, filed on Feb. 12, 2019.

(30) Foreign Application Priority Data

Mar. 12, 2018  (DE) .................... 10 2018 105 567.6

(51) Int. Cl.
  *F21S 41/24*  (2018.01)
  *F21S 43/235*  (2018.01)
  *B29D 11/00*  (2006.01)
  *B23K 26/21*  (2014.01)

(52) U.S. Cl.
  CPC ........ *F21S 41/24* (2018.01); *B29D 11/00663* (2013.01); *F21S 43/235* (2018.01); *B23K 26/21* (2015.10); *F21V 2200/10* (2015.01)

(58) Field of Classification Search
  CPC ... F21V 2200/10; B29C 65/16; B23K 26/206; B23K 26/21; B29D 11/00663; F21S 43/235; F21S 41/24
  See application file for complete search history.

(56) References Cited

U.S. PATENT DOCUMENTS

| 8,952,317 B2 | 2/2015 | Wunderer |
| 9,169,987 B2 | 10/2015 | Kirchner et al. |
| 9,366,795 B2 | 6/2016 | Weingaertner et al. |

(Continued)

FOREIGN PATENT DOCUMENTS

| DE | 297 21 948 U1 | 3/1999 |
| DE | 10 2007 035 021 A1 | 1/2009 |

(Continued)

OTHER PUBLICATIONS

International Search Report dated May 17, 2019 in corresponding application PCT/EP2019/053382.

*Primary Examiner* — Anne M Hines
(74) *Attorney, Agent, or Firm* — Muncy, Geissler, Olds & Lowe, P.C.

(57) ABSTRACT

A method for the production of a lighting device for a motor vehicle, including a transparent tube which surrounds an optical fiber connectable to a light source is positioned on a holder in such a way that the tube comes in contact with the holder in at least one area, wherein the contact area between the tube and the holder is subjected to laser radiation so that the tube is welded to the holder by means of a welding process.

10 Claims, 1 Drawing Sheet

(56) References Cited

U.S. PATENT DOCUMENTS

| | | |
|---|---|---|
| 9,534,766 B2 | 1/2017 | Fewkes et al. |
| 2002/0076172 A1* | 6/2002 | Meyer .................... G02B 6/421 385/91 |
| 2002/0122638 A1* | 9/2002 | Wang ................... G02B 6/4239 385/92 |
| 2005/0225991 A1 | 10/2005 | Yamazaki et al. |
| 2015/0276159 A1 | 10/2015 | Boero et al. |
| 2018/0081165 A1* | 3/2018 | Schultheis ......... A61B 1/00165 |

FOREIGN PATENT DOCUMENTS

| | | |
|---|---|---|
| DE | 10 2009 058 244 A1 | 6/2011 |
| DE | 10 2012 112 072 A1 | 6/2014 |
| DE | 10 2013 208 838 A1 | 11/2014 |
| EP | 2 481 978 A1 | 8/2012 |
| JP | 2013-232405 A | 11/2013 |
| WO | WO 2015/006302 A1 | 1/2015 |

* cited by examiner

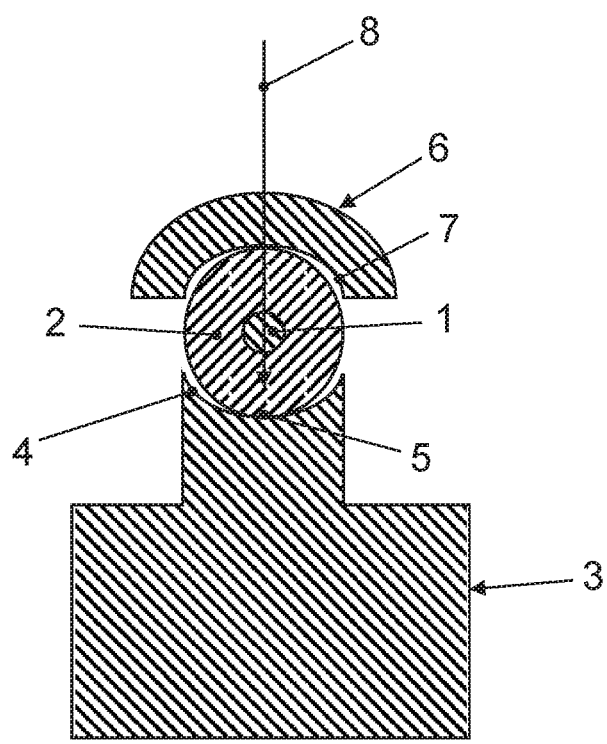

LIGHTING DEVICE FOR A MOTOR VEHICLE, AND METHOD FOR PRODUCING SAME

This nonprovisional application is a continuation of International Application No. PCT/EP2019/053382, which was filed on Feb. 12, 2019, and which claims priority to German Patent Application No. 10 2018 105 567.6, which was filed in Germany on Mar. 12, 2018, and which are both herein incorporated by reference.

BACKGROUND OF THE INVENTION

Field of the Invention

The present invention relates to a method for producing a lighting device for a motor vehicle and to a lighting device produced using this method.

Description of the Background Art

A method and a lighting device of the aforementioned type are known from WO 2015/006302 A1. The lighting devices described therein comprise a light source designed, for example, as a light emitting diode (LED) or diode laser, as well as an optical fiber connected to the light source and a transparent tube surrounding the optical fiber. The optical fiber is equipped with light-diffusing structures, so that when the lighting device is in operation, portions of the light propagating through the optical fiber exit laterally from the optical fiber and the tube. This partially results in a decorative luminous line. In some embodiments of the lighting devices described therein, the tube and the optical fiber are attached to a holder with clips. The tube and the optical fiber are overlapped at certain points, so that the light effect of a linear light source is disruptively interrupted at these joints.

In another embodiment of the lighting devices described in WO 2015/006302 A1, the tube surrounding the optical fiber is inserted into grooves in a transparent, plate-like holder and glued therein. A large part of the light exiting from the optical fiber in the transverse direction is coupled into the plate-like holder, so that it shines. The light effect of a linear light source is disrupted by the luminous holder.

An adhesive bond requires very precise positioning and dosing of the adhesive, in order to avoid unclean adhesive areas. Furthermore, with typical adhesive bonds of sufficient strength, a fixation of the adhesive area is required until the adhesive has cured.

SUMMARY OF THE INVENTION

It is therefore an object of the present invention to provide a method with which a tube with an optical fiber can be effectively fastened to a holder, without disrupting the light effect generated by the optical fiber. Furthermore, a lighting device is to be created in which the optical fiber forms a luminous line that is ideally uninterrupted when the lighting device is in operation.

Accordingly, it is intended that the contact area between the tube and the holder is subjected to laser radiation, so that the tube is connected to the holder by means of a welding process. The laser welding very quickly achieves a strong bond between the tube and the holder. As compared to other joining processes, this creates a very defined joint.

There is the possibility that, during the welding process, the tube is pressed by a press against the area of the holder that is to be subjected to the laser radiation. Due to the very short welding process, the press only has to be pressed against the tube for a short period of time.

It can be provided that the radiation of the contact area between the tube and the holder occurs with laser radiation in the transverse direction of the optical fiber through the optical fiber and/or through the tube and/or through the press. In this way, welding occurs exclusively on the rear side of the tube, so that the weld does not influence the light effect generated by the optical fiber.

There is the possibility that the tube is welded to the holder and/or to another suitable holder at several points spaced apart over its longitudinal direction. It can thereby be achieved that a comparatively long uninterrupted luminous line is generated.

It can be provided that the tube is bent prior to the welding process in order to assume the shape intended for the lighting device. Alternatively, it can be provided that the tube is bent during the welding process in order to assume the shape intended for the lighting device, wherein, in particular, the tube is heated prior to and/or during the welding process. This simplifies or enables reshaping of the tube between the weld points.

Also, it is intended that the lighting device is produced by a method according to the invention.

The lighting device can comprise a light source, an optical fiber connected to the light source, and a transparent tube surrounding the optical fiber, wherein the optical fiber is equipped with light-diffusing structures, so that when the lighting device is in operation, portions of the light propagating through the optical fiber exit laterally from the optical fiber and the tube.

It can be provided that the tube is attached at least partially to at least one holder on only one side, so that the lateral light exiting from the optical fiber and the tube results in an at least partially uninterrupted luminous line during operation of the lighting device. In particular, the light effect generated by the optical fiber is not influenced by the merely one-sided holder.

There is the possibility that the inside diameter of the tube is at least 1.5 mm larger than the outside diameter of the optical fiber and/or that the outside diameter of the tube is at most 4.0 mm. Due to the comparatively large inside diameter of the tube, the optical fiber can move relative to the tube during the bending. A filigree light effect can be guaranteed due to the maximum outer diameter of 4.0 mm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE shows a schematic sectional view of a detail of a lighting device according to the invention.

DETAILED DESCRIPTION

The embodiment of a lighting device shown in the FIGURE comprises a light source, which can be designed, for example, as a light-emitting diode (LED) or diode laser. The lighting device further comprises an optical fiber 1 into which the light from the light source can be coupled. The core of the optical fiber 1 can, for example, be equipped with light-diffusing structures, so that when the lighting device is in operation, portions of the light propagating through the optical fiber 1 can exit laterally from the optical fiber 1.

The lighting device further comprises a tube 2, in which the optical fiber 1 is arranged. The tube 2, in particular, can be a transparent plastic tube. In particular, the inner diameter of the tube 2 can be at least 1.5 mm greater than the outer diameter of the optical fiber 1. Furthermore, the outer diameter of the tube 2 can be, for example, 4.0 mm or less than 4.0 mm.

The lighting device further comprises a holder 3, which can, for example, be part of a housing of the lighting device. This holder 3 has a contour 4, which is partially hollow-cylindrical and corresponds to the outer contour of the tube 2. The tube 2 is welded to several areas 5 spaced apart over its longitudinal direction on the contour 4 of the holder 3, or on other comparable contours 4 of a holder 3, by means of a welding process.

To weld the tube 2 to the contour 4, press 6 is provided, which also have a partially hollow-cylindrical contour 7, which corresponds to the outer contour of the tube 2. The press 6, or the contour 7, are transparent in the exemplary embodiment, in particular transparent for the wavelength of a laser radiation 8 used for welding.

The tube 2 is positioned on the contour 4 of the holder 3 by a machine utilized for the attachment of the tube 2. Subsequently, the tube 2 is pressed by the contour 7 of the press 6 against the contour 4 of the holder 3, so that no gap remains between the tube 2 and the contour 4 of the holder 3 in the area 5 provided for the welding process. The contour 7 of the press and the contour 4 of the holder 3 position the tube 2 by virtue of its shape adapted to the outer diameter of the tube 2.

The area in which the tube 2 and the contour 4 of the holder 3 come in contact is subsequently subjected to the laser radiation 8. In the exemplary embodiment shown, the laser radiation 8 is supplied to the area 5 through the press 6 and through the tube 2 and, if appropriate, also through the optical fiber 1. Since the contour 4 of the holder 3 absorbs light of the wavelength of the laser radiation 8 more than the tube 2, the contour 4 is primarily melted in order to achieve the weld. After the welding process has ended, the press 6 is removed.

Instead of transparent press 6, two presses, spaced apart from one another, can also be provided, each of which can be pressed against the tube 2 directly adjacent to the area to be subjected to the laser radiation 8. The laser radiation 8 can then reach the area 5 to be welded by passing between these two presses.

If the tube 2 with the optical fiber 1 is to have a single or repeatedly bent shape in the lighting device, the tube 2 can be bent accordingly prior to the welding process. Alternatively, corresponding shaping can also take place during the welding process by welding at the welding points spaced apart over the longitudinal direction of the tube 2. For this purpose, the tube 2 is heated and reshaped prior to and/or during the welding.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a lighting device for a motor vehicle, the method comprising:
    positioning a transparent tube, which surrounds an optical fiber connectable to a light source, on a holder such that the tube comes in contact with the holder in at least one area; and
    subjecting the contact area between the tube and the holder to laser radiation so that the tube is connected to the holder via a welding process.

2. The method according to claim 1, wherein, during the welding process, the tube is pressed against the area of the holder that is to be subjected to the laser radiation.

3. The method according to claim 1, wherein the radiation of the contact area between the tube and holder occurs with laser radiation in a transverse direction of the optical fiber through the optical fiber and/or through the tube and/or through a press.

4. The method according to claim 1, wherein the tube is welded to the holder and/or another suitable holder at several points spaced apart over a longitudinal direction.

5. The method according to claim 1, wherein the tube is bent prior to the welding process in order to assume a shape intended for the lighting device.

6. The method according to claim 1, wherein the tube is bent during the welding process in order to assume the shape intended for the lighting device, and wherein, the tube is heated prior to and/or during the welding process.

7. A lighting device for a motor vehicle, produced via a method according to claim 1.

8. The lighting device according to claim 7, wherein the lighting device comprises:
    a light source;
    an optical fiber connected to the light source; and
    a transparent tube surrounding the optical fiber,
    wherein the optical fiber is equipped with light-diffusing structures, so that when the lighting device is in operation, portions of the light propagating through the optical fiber exit laterally from the optical fiber and the tube.

9. The lighting device according to claim 7, wherein the tube is attached at least partially to at least one holder on only one side, so that the lateral light exiting from the optical fiber and the tube results in an at least partially uninterrupted luminous line during operation of the lighting device.

10. The lighting device according to claim 7, wherein an inner diameter of the tube is at least 1.5 mm greater than the outer diameter of the optical fiber and/or that the outer diameter of the tube is at most 4.0 mm in size.

* * * * *